Dec. 4, 1923. 1,476,593
J. J. COFFEY
METHOD OF REMOVING SURFACE FAULTS FROM BILLETS
Filed Oct. 30, 1920
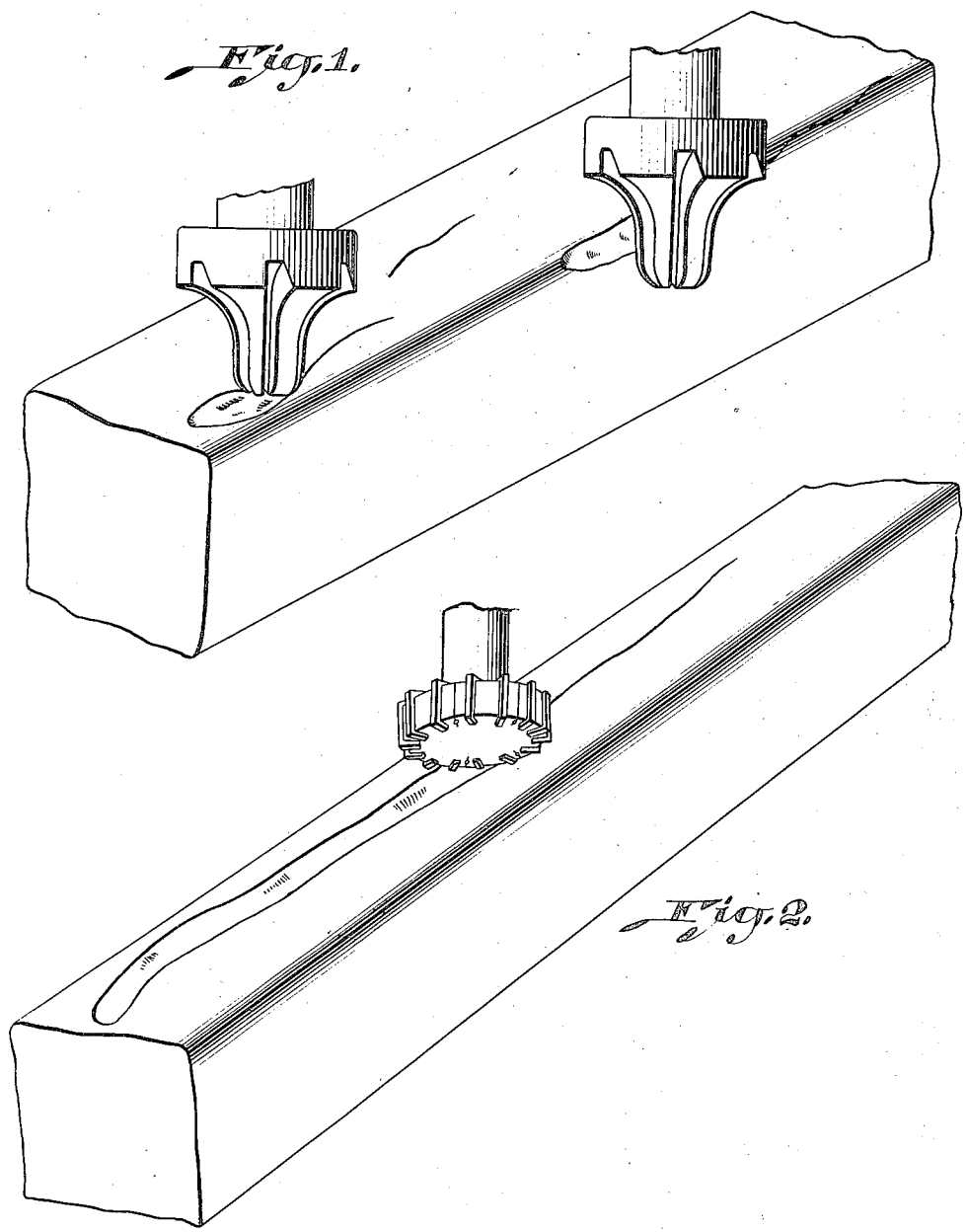

Patented Dec. 4, 1923.

1,476,593

UNITED STATES PATENT OFFICE.

JOHN JAMES COFFEY, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

METHOD OF REMOVING SURFACE FAULTS FROM BILLETS.

Application filed October 30, 1920. Serial No. 420,707.

*To all whom it may concern:*

Be it known that I, JOHN JAMES COFFEY, a citizen of the United States, and residing at Bethlehem, Lehigh County, State of Pennsylvania, have invented certain new and useful Improvements in Methods of Removing Surface Faults from Billets, of which the following is a specification.

The present invention relates to methods of removing surface faults such as seams, spots and blotches from ingots or the partly finished products of a rolling mill, so that the finished products of the mill will be free from defects. It is well known in rolling mill practice that faults present in the ingot or billet will appear in the finished product if they are not removed before the completion of the rolling process, and also that a thorough removal of such faults either before the beginning of the rolling operations or at some intermediate stage, will insure a product having no serious surface imperfections, the rolling operations having the effect of filling out any hollows or shallow cavities in the work resulting from the removal of defective portions of its surface. A common fault of railroad rails for instance, is that they may have longitudinal surface cracks or soft spots, if the faults of the original ingot are not carefully removed, the length of the useful life of the rail being thereby cut down and the rail being sometimes so weakened that it will break under ordinary traffic.

According to this invention, any ingot, bloom, slab, billet or sheet bar which, upon examination, appears to have surface faults, may be placed upon a movable bed of a milling machine or in any position in which the defects or faults may be reached by a cutting tool, such as a milling cutter or a routing tool operated by power mechanism whereupon, by effecting the relative movement of the cutting tool and the work, the seam or fault may be removed, no matter what its position, its shape, or its depth. In the accompanying drawings I have illustrated different types of cutting tools which may be employed for the purpose and show each tool in position to mill out a fault or defect which it is particularly adapted to remove.

In Figures 1 and 2 are illustrated two forms of cutting tools which will satisfactorily perform the work required, the tools being illustrated in operative positions.

In Figure 1 a pair of rose milling cutters are shown, one of which is adjusted to remove a seam from a corner of a billet and the other of which is in position to remove a short seam from one of the sides.

The various cutters are selected in accordance with the work to be done and a cut of any width, depth and length may be made by selecting the proper tool. In Figure 2 I have shown a shell milling cutter in position to remove surface seams from the sides of a billet. A convex milling cutter may be used where the seam extends some short distance into the billet while the shell milling cutter is used to remove shallow seams and defects. As before explained, the work may be performed and the process may be carried out by means of a milling machine of standard and well known construction, but it will be obvious that other machines may be employed to operate the cutters and that the cutter may be arranged to be moved relatively to the billet instead of having the billet moved relative to the cutter as is common in milling machines. Still other types of cutters may be used, the two illustrated being by way of example only.

Having thus described the invention what is claimed as new and desired to be secured by Letters Patent is:

1. The method of removing seams from billets and similar articles consisting in removing from the body of the billet the metal adjacent the seam and forming its marginal walls, by means of a cutting tool, the cutting edge of the tool moving, in its cutting action, substantially transversely of the seam.

2. The method of removing seams from billets and similar articles consisting in removing from the body of the billet the metal adjacent the seam and forming its marginal walls, by means of a cutting tool having a plurality of cutting edges which successively move, in their cutting action, substantially transversely of the seam.

3. The method of removing seams from billets and similar articles consisting in removing from the body of the billet the metal adjacent the seam and forming its marginal walls, by means of a cutting tool, the cutting edge of the tool being moved, in its cutting action, substantially transversely of the seam and also being simultaneously moved longitudinally of the seam.

In testimony whereof I affix my signature.

JOHN JAMES COFFEY.